J. E. GLEASON.
GEAR CUTTER.
APPLICATION FILED SEPT. 15, 1916.
1,236,834.
Patented Aug. 14, 1917.
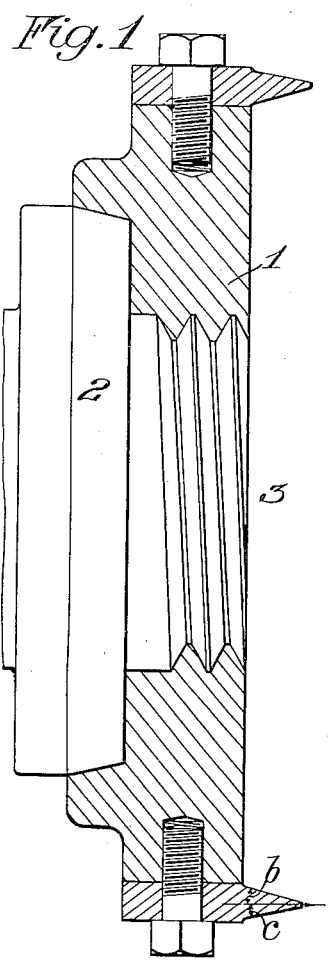
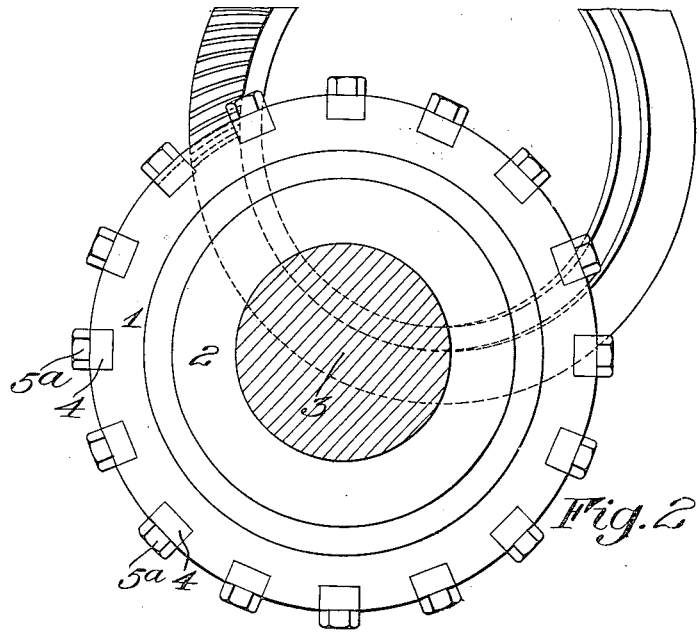
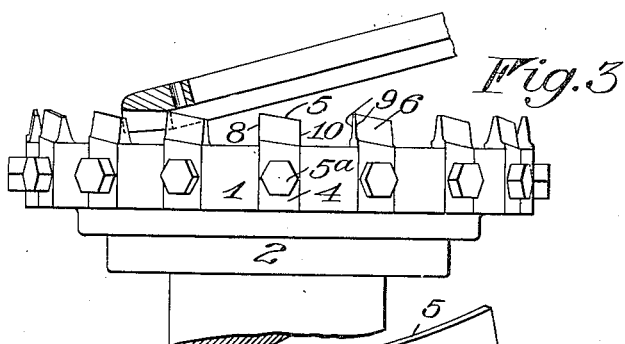
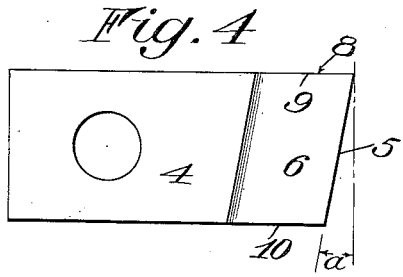
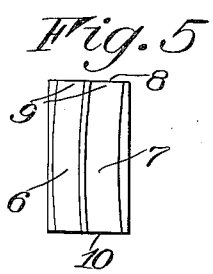
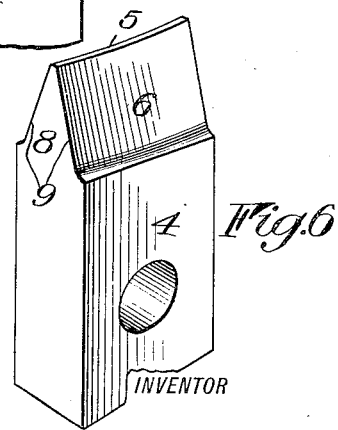
WITNESSES:
Walter B. Payne
INVENTOR
James E. Gleason
BY
his ATTORNEYS

UNITED STATES PATENT OFFICE.

JAMES E. GLEASON, OF ROCHESTER, NEW YORK, ASSIGNOR TO GLEASON WORKS, OF ROCHESTER, NEW YORK, A CORPORATION OF NEW YORK.

GEAR-CUTTER.

1,236,834.           Specification of Letters Patent.         Patented Aug. 14, 1917.

Original application filed May 26, 1913, Serial No. 769,808. Divided and this application filed September 15, 1916. Serial No. 120,239.

*To all whom it may concern:*

Be it known that I, JAMES E. GLEASON, of Rochester, in the county of Monroe and State of New York, have invented certain new and useful Improvements in Gear-Cutters; and I do hereby declare the following to be a full, clear, and exact description of the same, reference being had to the accompanying drawings, forming a part of this specification, and to the reference-numerals marked thereon.

My invention has to do with the cutting of various types of gears, particularly the more usual spur and bevel gears, and is designed with special reference to what are known commonly as spiral or curved tooth gears, characterized by a continuous curvature of each tooth from end to end to produce more silent action, and from the gradual or overlapping engagement that takes place between coöperating tooth surfaces, greater efficiency. The object of the invention is to construct a cutter that can be commercially and practically used with success in the production of curved tooth gears, particularly where the gear is formed on the arc of a circle, as for instance, by moving the cutting portion or blade in a circular path. In a more specific aspect, the invention consists in so forming the cutting portion of a blade as to permit it to pass through a tooth space in a relative circular path, for imparting longitudinal curvature to the tooth while at the same time giving the required pressure angle to the tooth profile, without wedging, or engaging the work at any points except along the cutting edge, thereby insuring clearance between all parts of the cutting portion, except the cutting edge, and the work. A further purpose of the invention is to improve the construction of gear cutter blades, and to obtain a more correct form of tooth profile for bevel gearing particularly. To these and other ends the invention resides in certain improvements and combinations of parts all as will be hereinafter more fully described, the novel features being pointed out in the claims at the end of the specification.

In the drawings:

Figure 1 is a sectional view showing a cutter constructed in accordance with my invention according to a preferred arrangement;

Fig. 2 is a plan view showing the relative position of cutter and blank during the cutting operation;

Fig. 3 is a side elevation of the parts shown in Fig. 1;

Fig. 4 is a side view of one of the blades;

Fig. 5 is an end view, and

Fig. 6 is a perspective view.

Similar reference numerals throughout the several views indicate the same parts.

The present application is a division of an application filed by me May 26, 1913, Serial No. 769,808, the cutter herein disclosed being a part of the apparatus covered in said application, although it is susceptible of other uses as well and may be adapted on any cutting machine involving the production of curved teeth or circular slots, by a relative curved movement between the blade and the tooth to be cut.

In its general aspect, the invention consists of a disk-like or circular head or support carrying a plurality of blades which extend generally in a direction parallel to the axis of the head with their cutting portions projecting beyond the adjacent face of the head and adapted to engage the work by movement in a circular path when the head or support is rotated. The cutting portion of the blade is formed on the arc of a circle, having its outer end and sides relieved from the front toward the back in order to provide clearance in passing through the slot of the blank, and this effect is secured by employing a cutting portion constituting a section of a helix with reference to the axis of the head or support upon which the blade is mounted. In other words, the form of the cutting portion of each individual blade is such that if continued, it would produce a helical body upon a cylinder, the axis of which is the rotary axis of the cutter-head. Both sides of the cutting portion and also its outer end are formed upon arcs of a circle, forming a body which is tipped outwardly at its front end, so to speak, from the adjacent side face of the head, to relieve the end and sides of the cutting portion so that the cutting edge is the only part that engages the blank, and the outermost points of the several cutting edges all lie in a single plane perpendicular to the rotary axis of the head. The angles which the sides of the cutting portion form with relation to the axis of the head correspond substantially to the effective pressure angle of the tooth to be cut, it being understood that by "effective pressure angle" I mean the pressure angle at the center of the tooth. In the production of bevel gears, the effective pressure angle is slightly different from the corresponding angle of the cutting edge, and correction must be made for this, as will be more fully pointed out hereinafter. The general resulting form of blade is such as to form a trapezoid on a plane passing through the cutting portion radially with reference to the cutter head, the height of the trapezoid being slightly greater than the depth of cut to be produced, and the width of the top of the trapezoid or, in other words, the width of the outer end of the cutting portion, being as small as possible to permit of cutting opposite sides of a tooth space on very nearly the same radii.

In the illustrated embodiment of the invention, 1 designates the cutter head or support adapted to be mounted upon a spindle 2, and rotated about an axis indicated at 3. The head carries a plurality of blades each of which includes a base portion 4 that is received in a slot or opening formed in the periphery of the head and is held in place by a set screw 5. It will be understood that the particular form of attaching means between the blade and the head or support is not an essential part of my invention as other methods of attachment may be employed, depending upon the nature of the particular work or the form of adjustment that may be required in setting the blades. As the blades are all similarly constructed and mounted upon the cutter head, I will for convenience describe only one of them in the following explanation.

The base portion of the blade has already been referred to as 4 and is integrally connected with the cutting portion which extends outwardly from the adjacent face of the cutter head and includes an outer end 5 and sides 6 and 7. The cutting portion includes also a front wall 8, cutting edges 9, and rear wall 10, the opposite cutting edges being designed to cut upon opposite walls of a tooth space, that is to say, upon the adjacent walls of two adjacent teeth. While I have shown an arrangement designed for cutting with opposite edges of each blade, this is not an essential feature of the invention, as the same general object may be carried out in other ways than that here shown. For instance, it may in some cases be preferable to employ separate blades for cutting opposite surfaces, having only one cutting edge on each blade and with such an arrangement, it would be possible either to employ two cutter heads with all the cutting edges of each arranged either on the inside or on the outside of the blades or a single cutter-head may be used with alternate blades cutting upon one side and the remaining blades cutting upon the opposite side of a tooth.

The outer end 5 as well as the side faces 6 and 7 are formed upon arcs of a circle as will be seen from Figs. 4 and 5 and the end and side walls are relieved from front to back to afford the necessary clearance. This relief is obtained by having the back of the circular cutting portion set inwardly with reference to the front and to the cutter-head, so that the cutting portion as a whole is at an angle with reference to the face of the cutter-head and this clearance angle is designated by $a$. The effect produced by the cutting portion thus formed is to constitute it of helical form with reference to the rotary axis of the cutter-head, and the cutting portion may be defined as having the form of a helical body with the angle of lead $a$, upon a cylinder, having an axis coinciding with the axis of the cutter-head. The body of the cutter portion when viewed in a radial plane with reference to the cutter-head axis is of trapezoidal contour, with its outer end comparatively narrow so that the opposite cutting edges may produce curved cuts upon arcs of circles that are sufficiently similar for all practical purposes. The side faces of the cutting portions, 6 and 7, or the sides of the trapezoidal cross section, have angles with reference to the rotary axis of the head, corresponding closely to the effective pressure angle of the tooth to be cut upon the gear blank. In the production of some curved tooth bevel gears, the angle of the cutting edge does not produce quite the same effective pressure angle upon the tooth, by reason of the adjustment of the cutter-head that is required when cutting along other than the pitch line of a tooth, and I have made allowance for this by slightly increasing the angle upon the inside of the cutting portion, that is, by increasing the angle $b$ and slightly decreasing the angle $c$ upon the outside of the cutting portion. This correction for pressure angle is determined by, or is in proportion to the angle of spiral of the tooth to be cut, the modification of the pressure angles of the cutting portion being greater as the angle of spiral increases for any given pair of bevel gears.

The extreme outermost points of the cutting edges of the different blades all lie in the same plane, which extends perpendicular to the axis of the cutter-head, so that the different cutting edges will all cut upon the same angle and to the same depth. The cutting portions of the blades, which are formed from high speed steel or other metal sufficiently hardened for the purpose, are finished by being ground in a suitable machine that forms the subject-matter of another invention, the action of which is to grind the side faces and outer end of the cuting portion by a relieving motion and thus impart to said surfaces a ground finish with three surfaces relieved for clearance. This insures a true, accurate formation of the cutting portion in accordance with the shape of the tooth to be cut, which cannot be accomplished except by finally grinding the surfaces, and I believe it to be new to construct a blade or cutting member in which the cutting portion is of relieved circular or curved formation, or in the form of a helix, and in which the relieved surfaces are ground, that is to say, finished by a grinding operation.

It is my purpose to cover by this application any modifications or departures from the present disclosure, that may include a gear cutter having a curved cutting portion, of helical formation, and ground surfaces that are relieved to afford proper clearance.

I claim as my invention:

1. A gear cutter comprising a head or support adapted to be rotated and a blade extending in a direction generally parallel to the axis of the head and including a base portion attached thereto and a cutting portion formed on the arc of a circle and having its outer end and sides relieved.

2. A gear cutter comprising a head or support adapted to be rotated and a blade formed of high speed steel and extending in a direction generally parallel to the axis of the head and including a base portion attached to the head and a cutting portion formed on the arc of a circle, the outer end and sides of the cutting portion having ground surfaces which are relieved with reference to the cutting edge.

3. A gear cutter blade having a cutting portion formed on the arc of a circle from front to back and having the outer end and sides relieved with reference to the cutting edge.

4. A gear cutter blade having a cutting portion formed on the arc of a circle from front to back.

5. A gear cutter comprising a head or support adapted to be rotated and carrying a plurality of blades each having a cutting portion formed on the arc of a circle from front to back.

6. A gear cutter comprising a head or support adapted to be rotated and carrying a plurality of blades, the outermost points of which all lie in a single plane perpendicular to the rotary axis of the head.

7. A gear cutter comprising a head or support adapted to be rotated and carrying a blade provided with a cutting portion having a trapezoidal cross section taken in a plane radially of the head.

JAMES E. GLEASON.

Witnesses:
A. G. VAYO,
E. W. BULLOCK.